US009977132B2

(12) United States Patent
Lennen et al.

(10) Patent No.: US 9,977,132 B2
(45) Date of Patent: May 22, 2018

(54) ARCHITECTURE FOR POWER CONSUMPTION REDUCTION IN GNSS RECEIVERS

(71) Applicant: Samsung Electronics Co., Ltd., Gyeonggi-do (KR)

(72) Inventors: Gary Lennen, Cupertino, CA (US); Henry Falk, Long Beach, CA (US)

(73) Assignee: Samsung Electronics Co., Ltd (KR)

( * ) Notice: Subject to any disclaimer, the term of this patent is extended or adjusted under 35 U.S.C. 154(b) by 638 days.

(21) Appl. No.: 14/559,506

(22) Filed: Dec. 3, 2014

(65) Prior Publication Data

US 2016/0011317 A1 Jan. 14, 2016

Related U.S. Application Data

(60) Provisional application No. 62/022,468, filed on Jul. 9, 2014.

(51) Int. Cl.
*G01S 19/34* (2010.01)

(52) U.S. Cl.
CPC .................................... *G01S 19/34* (2013.01)

(58) Field of Classification Search
CPC ........... G01S 19/34; G01S 19/37; G01S 19/35
USPC .................................................... 342/357.74
See application file for complete search history.

(56) References Cited

U.S. PATENT DOCUMENTS

| | | | | |
|---|---|---|---|---|
| 7,573,422 B2 * | 8/2009 | Harvey | G01S 19/34 342/357.74 |
| 8,009,090 B2 | 8/2011 | Vishin et al. | |
| 8,024,588 B2 | 9/2011 | Cheng et al. | |
| 8,065,075 B2 * | 11/2011 | Tai | G01C 21/00 701/490 |
| 8,106,821 B2 * | 1/2012 | Farmer | G01S 19/34 342/357.62 |
| 8,134,502 B2 | 3/2012 | Lennen | |
| 2009/0109091 A1 | 4/2009 | Thind et al. | |
| 2009/0174596 A1 * | 7/2009 | Gekat | G01S 7/024 342/26 R |
| 2010/0103038 A1 | 4/2010 | Yeh et al. | |
| 2012/0092214 A1 | 4/2012 | Lee et al. | |
| 2012/0146848 A1 | 6/2012 | Ezer et al. | |
| 2013/0093496 A1 * | 4/2013 | Waters | H04B 1/1615 327/365 |

FOREIGN PATENT DOCUMENTS

WO WO2005004502 A2 1/2005

* cited by examiner

*Primary Examiner* — Frank J McGue
(74) *Attorney, Agent, or Firm* — The Farrell Law Firm, P.C.

(57) ABSTRACT

A global navigation satellite system (GNSS) receiver is provided. The GNSS receiver includes a front end processor (FEP) including a low power signaling path and a high power signaling path; an individual GNSS satellite processing (IGSP) module including a low power signaling path and a high power signaling path; and a module programmed to detect a carrier-to-noise density ($C/N_o$) of a signal received at the GNSS receiver and select at least one of the low power signaling path and the high power signaling path of the FEP and IGSP module based on the detected $C/N_o$.

16 Claims, 10 Drawing Sheets

| NCO phase of $48f_X$ clock | cos | sin |
|---|---|---|
| 0 | 3 | 0 |
| 1 | 2 | 2 |
| 2 | -1 | 3 |
| 3 | -3 | 1 |
| 4 | -3 | -1 |
| 5 | 0 | -3 |
| 6 | 2 | -2 |
| 7 | 3 | 0 |
| 8 | 2 | 3 |
| 9 | -1 | 3 |
| 10 | -3 | 1 |
| 11 | -2 | -2 |
| 12 | 0 | -3 |
| 13 | 2 | -2 |
| 14 | 3 | 1 |
| 15 | 1 | 3 |
| 16 | -1 | 3 |
| 17 | -3 | 0 |
| 18 | -2 | -2 |
| 19 | 0 | -3 |
| 20 | 3 | -2 |
| 21 | 3 | 1 |
| 22 | 1 | 3 |
| 23 | -2 | 2 |

| NCO phase of $48f_X$ clock | cos | sin |
|---|---|---|
| 24 | -3 | 0 |
| 25 | -2 | -2 |
| 26 | 1 | -3 |
| 27 | 3 | -1 |
| 28 | 3 | 1 |
| 29 | 0 | 3 |
| 30 | -2 | 2 |
| 31 | -3 | 0 |
| 32 | -2 | -3 |
| 33 | 1 | -3 |
| 34 | 3 | -1 |
| 35 | 2 | 2 |
| 36 | 0 | 3 |
| 37 | -2 | 2 |
| 38 | -3 | -1 |
| 39 | -1 | -3 |
| 40 | 1 | -3 |
| 41 | 3 | 0 |
| 42 | 2 | 2 |
| 43 | 0 | 3 |
| 44 | -3 | 2 |
| 45 | -3 | -1 |
| 46 | -1 | -3 |
| 47 | 2 | -2 |

FIG. 4

1-bit sign value requires values to be mapped into space +/-1, there is no zero representation.

| After circuit | CNO Loss (d8s) as above | CNO Loss (d8s) alternate |
|---|---|---|
| complex mix | 0.88 | |
| Σ2 2fx samples | 1.08 | |
| Pre-Matched Filter 1-bit (includes zeros) | 1.49 | |
| Pre-Matched Filter zero adjust (does not include zeros) | 3.51 | 2 |

ARCHITECTURE FOR POWER CONSUMPTION REDUCTION IN GNSS RECEIVERS

PRIORITY

This application claims priority under 35 U.S.C. § 119(e) to U.S. Provisional Patent Application Ser. No. 62/022,468, which was filed on Jul. 9, 2014, the entire disclosure of which is incorporated herein by reference.

BACKGROUND OF THE INVENTION

Field of the Invention

The present disclosure relates to generally to architecture for power consumption reduction in global navigation satellite system (GNSS) receivers, and more particularly, to GNSS receivers including a selectable low power signaling path and a selectable high power signaling path, which are configured to process signals received at the GNSS receiver based on a carrier-to-noise density ($C/N_o$) of the received signal.

Description of the Related Art

Multiple satellite navigation systems such as GPS (USA), Glonass (Russia), Beidou (China), and Galileo (Europe) are now emerging with each system transmitting from approximately 30 satellites, leading to greater than 120 navigation satellites that are available to consumer grade GNSS receivers (e.g. in smart phones). Each of these satellite navigation systems transmits on different frequencies with different signal structure, and there is a high probability that satellites from multiple satellite navigation systems will have a diverse range of received powers at the GNSS receiver. A challenge, therefore, for GNSS receiver developers is to provide simultaneous GNSS receiver access to all of the aforementioned satellite systems while reducing power consumption at the GNSS receiver.

Various factors may play a role in the received powers at the GNSS receiver. For example, received signal power at a user's antenna of the GNSS receiver may range from approximately 5 dB-Hz to 54 dB-Hz depending on antenna type and signal reception environment. For example, some antennas (e.g. patch antennas used for built-in car navigation systems) may have higher gain in the zenith direction, while some antennas (e.g. wire antennas in smart phones) may have a more isotropic antenna receive pattern. Received signal power of the received signals may also vary significantly due to signal blockage and fading, which may be caused by multipath phase altered version of the direct signal arriving at the GNSS receiver antenna.

Conventional GNSS receivers process the received signals using complex circuitry that is configured to mitigate interference associated with a received signal, e.g., when a received signals $C/N_o$ is relatively low (e.g. less than or equal to 20 dB-Hz), to ensure that the information provided on the signal is processed successfully, e.g., to maintain minimum GNSS acquisition/tracking and measurement integrity; such complex circuitry uses a significant amount of power to process these signals.

Conventional GNSS receivers use the same complex circuitry to process received signals that have relatively high $C/N_o$ (e.g. greater than or equal to 30 dB-Hz), which, in turn, may result in an unnecessary waste of power. More particularly, received signals with relatively high $C/N_o$, typically, have a significant design margin with respect to minimum GNSS acquisition/tracking and measurement thresholds and therefore may not require such complex circuitry. For example, if a particular GNSS satellite is received with a $C/N_o$ of 50 dB-Hz there is approximately 20 dB-Hz of margin before measurement quality, and hence navigation accuracy, is overly effected. As can be appreciated, such received signals can, therefore, be processed using circuitry that is simpler than the complex circuitry used for processing a signal with relatively low $C/N_o$.

Therefore, there exists a need for GNSS receivers including a selectable low power signaling path and a selectable high power signaling path, which are configured to process signals received at the GNSS receiver based on a $C/N_o$ of the received signal.

SUMMARY OF THE INVENTION

Aspects of the present invention are made to address at least the above mentioned problems and/or disadvantages and to provide at least the advantages described below.

Accordingly, GNSS receivers that include a selectable low power signaling path and a selectable high power signaling path, which are configured to process signals received at the GNSS receiver based on a $C/N_o$ of the received signal may prove useful in telecommunications.

An aspect of the present invention provides a GNSS receiver with multiple selectable signal processing paths, some of which allow significant power consumption savings when a tradeoff with $C/N_o$ is made.

Another aspect of the present invention provides a GNSS receiver with power reduction signal processing modes on a satellite by satellite constellation basis and on an individual satellite by satellite basis.

Another aspect of the present invention provides a GNSS receiver with selectable dual signal processing paths in a front end processor (FEP) and individual GNSS satellite processing (IGSP) module of the GNSS receiver. More particularly, a first path is designed primarily for full performance (in terms of minimal $C/N_o$ loss and maximum interference mitigation capability), and a second path is designed primarily for minimal power consumption, trading off $C/N_o$ loss and interference mitigation capability for lower power consumption.

In accordance with a first aspect of the present invention, a GNSS receiver is provided. The GNSS receiver includes an FEP including a low power signaling path and a high power signaling path; an IGSP module including a low power signaling path and a high power signaling path; and a module programmed to detect a $C/N_o$ of a signal received at the GNSS receiver and select at least one of the low power signaling path and the high power signaling path of the FEP and IGSP module based on the detected $C/N_o$.

In accordance with a second aspect of the present invention, a method for processing a signal received from a GNSS is provided. The method including receiving, at a GNSS receiver, a signal transmitted from a GNSS, detecting a $C/N_o$ of the received signal, and selecting at least one of a low power signaling path and a high power signaling path of a FEP and an IGSP module of the GNSS receiver based on the detected $C/N_o$.

In accordance with a third aspect of the present invention, a GNSS receiver is provided. The GNSS receiver includes a front end processor (FEP) including a low power signaling path and a high power signaling path and a module programmed to detect a $C/N_o$ of a signal received at the GNSS receiver and select at least one of the low power signaling path and the high power signaling path of the FEP based on the detected $C/N_o$.

In accordance with a fourth aspect of the present invention, GNSS receiver is provided. The GNSS receiver includes an IGSP module including a low power signaling path and a high power signaling path and a module programmed to detect a $C/N_o$ of a signal received at the GNSS receiver and select at least one of the low power signaling path and the high power signaling path of the IGSP module based on the detected $C/N_o$.

BRIEF DESCRIPTION OF THE DRAWINGS

The above and other aspects, features, and advantages of certain embodiments of the present invention will be more apparent from the following detailed description taken in conjunction with the accompanying drawings, in which:

FIG. 4 is a chart illustrating a sin/cos look-up table (LUT) including values that may be used for locally generating an input to a complex mixer of the FEP, according to an embodiment of the present invention;

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As noted above, GNSS receivers that include a selectable low power signaling path and a selectable high power signaling path, which are configured to process signals received at the GNSS receiver based on a carrier-to-noise density ($C/N_o$) of the received signal may prove useful in telecommunications, and such a GNSS receiver is herein described.

Figure 1:
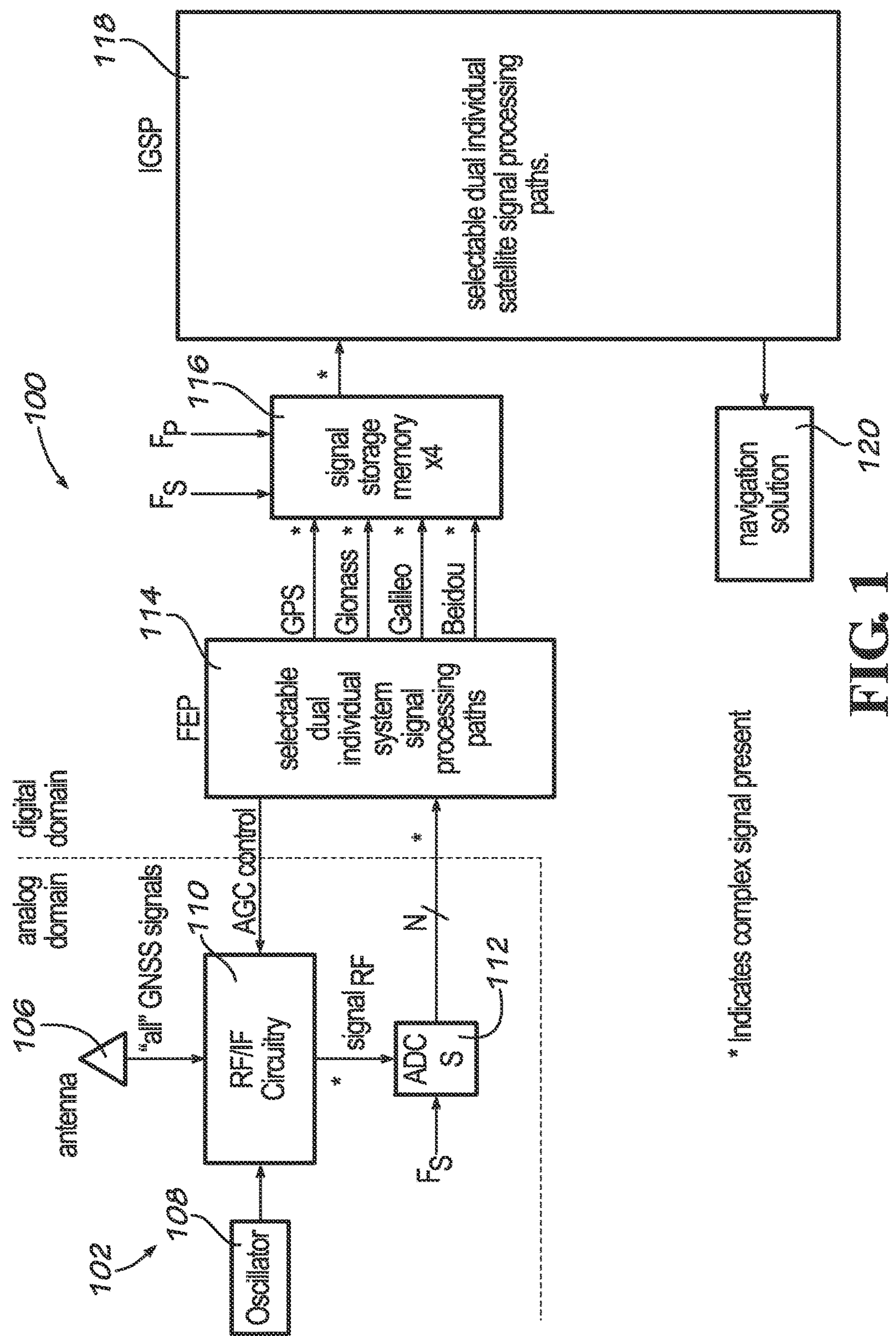
FIG. 1 is a diagram illustrating components of a GNSS receiver, according to an embodiment of the present invention.

FIG. 1 is a diagram illustrating components of a GNSS receiver 100, according to an embodiment of the present invention. As illustrated in FIG. 1, the GNSS receiver 100 includes an analog domain 102 and a digital domain 104, which are controlled by a processor or processors (not shown) for controlling the overall operation of the GNSS receiver 100. The analog domain 102 receives GNSS signals from one or more GNSSs such as GPS (USA), Glonass (Russia), Beidou (China), and Galileo (Europe) via an antenna 106. The GNSS receiver 100 may also be configured to receive signals form other GNSSs, such as augmented GNSSs.

The analog domain 102 includes an oscillator 108, radio frequency/intermediate frequency (RF/IF) circuitry 110 and at least one analog-to-digital converter (ADC) 112. The oscillator 108 operates in a known manner and a description thereof will be omitted for conciseness.

An RF/IF receiver (not explicitly shown) of the RF/IF circuitry 110 receives an analog signal through the antenna 106 and transmits the analog signal to the ADC 112, which converts the analog signal to a digital signal that is transmitted to the digital domain 104 for processing.

Continuing with reference to FIG. 1, the digital domain 104 includes an FEP 114 including a signal storage memory 116, an IGSP module 118, and a navigation solution module 120. These components process the digitized signal received from the ADC 112 thereby allowing the GNSS receiver to acquire and track a satellite that transmitted the received signal.

The navigation solution module 120 operates in a known manner and a description thereof will be omitted for conciseness.

Figure 2:
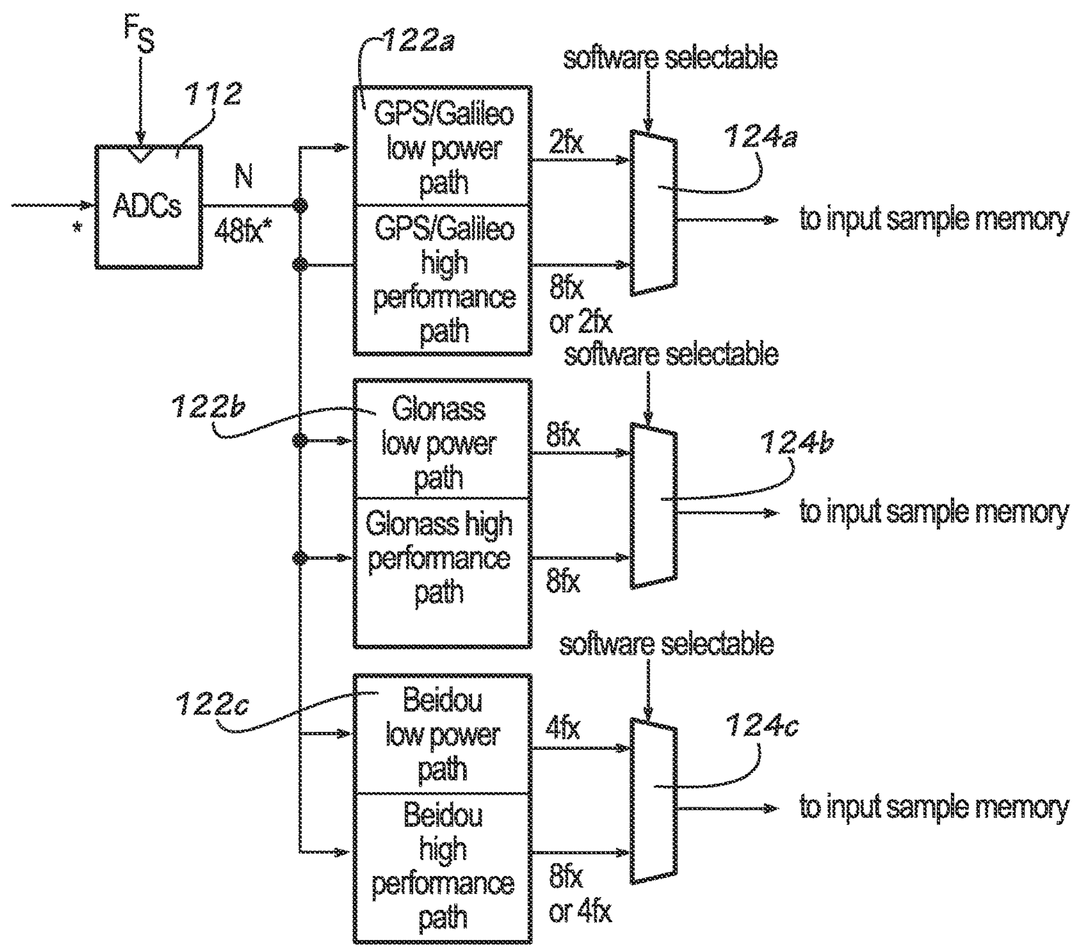
FIG. 2 is a diagram illustrating a FEP of the GNSS, according to an embodiment of the present invention.

FIG. 2 is a diagram illustrating the FEP 114, according to an embodiment of the present invention. The FEP 114 is operable in two modes of operation. Specifically, the FEP 114 is operable in a first mode (e.g., a high power mode) of operation for when full performance (e.g., in terms of minimal $C/N_o$ loss and maximum interference mitigation capability) is required at the GNSS receiver 100 and a second mode (e.g., a low power mode) of operation for when less than full performance is required at the GNSS receiver 100 (e.g., in terms of minimal power consumption, trading off $C/N_o$ loss and interference mitigation capability for lower power consumption).

The FEP 114 is configured to operate under the first and second modes of operation for processing signals received from each of the aforementioned GNSSs, e.g., GPS, Glonass, Beidou, and Galileo. To this end, the FEP 114 is shown including a GNSS receiver processing module 122*a* which is configured to process signals received from the GPS/Galileo GNSSs and GNSS receiver processing modules 122*b*, 122*c* which are configured to process signals received from the Glonass and Beidou GNSSs, respectively. As can be appreciated, more or fewer GNSS processing modules may be used. For example, the FEP 114 can include four GNSS receiver processing module, i.e., a GNSS receiving processing module for each GNSS. The GNSS receiver processing modules 122*a*-122*c* each includes a low power signaling processing path and a high power signal processing path.

Continuing with reference to FIG. 2, the FEP 114 includes three modules 124*a*-124*c*, e.g., multiplexers, that communicate with each of the GNSS receiver processing modules 122*a*-122*c*, although more or fewer modules may be used.

For example, one module can be programmed to communicate with each of the processing modules 122a-122c. The modules 124a-124c are each programmed to detect a $C/N_o$ of a signal received at the GNSS receiver 100 and select the first or second modes of operation of the FEP 114. More particularly, if the detected $C/N_o$ is above or equal to a predetermined threshold, the modules 124a-124c may select the second mode of operation, e.g., the low power signaling processing path, for the FEP 114 (and/or the IGSP module 118). In accordance with an embodiment of the present invention, the predetermined threshold of $C/N_o$ of the received signal ranges from 21 dB-Hz to 54 dB-Hz. Moreover, if the detected $C/N_o$ is below or equal to a predetermined threshold, the modules 124a-124c may select the first mode of operation, e.g., the high power signaling processing path, for the FEP 114 (and/or the IGSP module 118). In accordance with an embodiment of the present invention, the predetermined threshold of $C/N_o$ of the received signal may range from 5 dB-Hz to 20 dB-Hz.

Each of the modules 124a-124c is configured to select between the high power signaling processing path and the low power signaling path when passing on the received signal to the signal storage memory 116, such that when a mode of operation is selected, e.g., either the low power signal processing path or the high power signal processing path, the other signal processing path is turned OFF and the components of that path are rendered in operable, for example by a clock gating operation.

$C/N_o$ threshold mode considerations can include, but are not limited to, data decode thresholds of a GNSS receiver, which can range from about 23-30 dB-Hz (depending on GNSS system), GNSS receiver dynamics (e.g., higher dynamics requiring wider tracking loop bandwidths, which, in turn, benefit from higher received $C/N_o$), and tracking thresholds of a GNSS receiver, which can range from about 5-12 dB-Hz (depending on data stripping availability of the GNSS receiver).

In accordance with embodiments of the present invention, the $C/N_o$ loss associated with the low power signaling processing path may be determined via design simulation or post design measurement under controlled conditions. For example, if it is known that processing a received signal via the low power signaling path when the second mode of operation is enabled causes 5 dB loss in a satellite receive signal path then the GNSS receiver 100 can adjust its reported $C/N_o$ measurement upwards by 5 dB to compensate for the 5 dB loss such that the signal strength observed at the GNSS receiver 100 does not reflect entering the second mode of operation.

Figure 3:
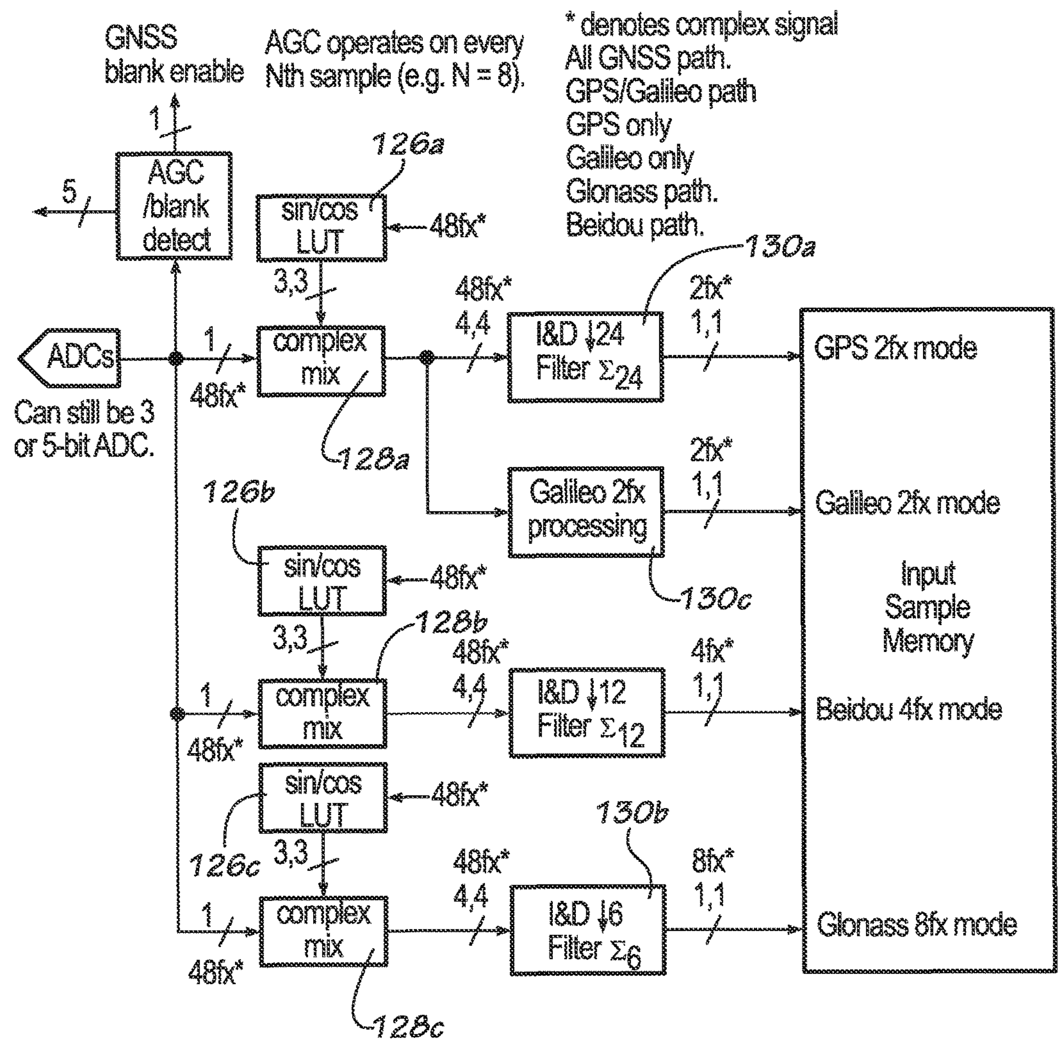
FIG. 3 is a diagram illustrating low power circuitry components of the FEP shown in FIG. 2, according to an embodiment of the present invention.

FIG. 3 is a diagram illustrating low power circuitry components of the FEP 114, according to an embodiment of the present invention. As illustrated in FIG. 3, the FEP 114 includes for each GNSS a respective sin/cos local carrier generation module 126a-126c, complex mixer 128a-128c, and an integrate and dump (I&D) filter 130a-130c. In addition, for the Galileo/GNSS the FEP 114 also utilizes a separate processing block 131, which may be used specifically for processing Galileo signals.

When the low power signal processing path is selected for a corresponding GNSS, the components of the low power signal processing paths associated with a particular GNSS are configured to process less bits (e.g., one-bit, two-bits, three-bits, etc.) than the ADC 112 is capable of outputting, e.g., 5-10-bit output when the high power signal processing path is selected. It is noted that in Gaussian noise, processing one-bit from the ADC 112 adds approximately 2 dB $C/N_o$ of loss, processing two-bits adds approximately 0.5 dB $C/N_o$ loss, processing three-bit adds approximately 0.2 dB $C/N_o$ loss, etc.

The low power signal processing paths can process, for lowest power operation, a one-bit (e.g., a sign bit) representation of the signal received from the ADC 112. In this instance, the low power signal processing paths associated with each of the GNSSs output a one-bit signal for storage into the input sample memory 116 which is then transmitted to the IGSP module 118 so that it may be processed by the low power signal processing path of the IGSP module 118, as described in greater detail below. Representing the received signal with one-bit, compared to higher bit representations, provides a minimal amount of additional $C/N_o$ loss. For example, representing a received signal with one-bit compared to two-bits only adds an additional $C/N_o$ loss of 1.5 dB, which is not a significant amount when interference is at a minimum.

In certain instances, it may prove advantageous to process a two-bit or a three-bit representation of the received signal, e.g., when a detected $C/N_o$ is relatively low (e.g., 25 dB Hz). While processing a two-bit or three-bit representation may decrease $C/N_o$ loss, it does somewhat tend to increase power consumed by the GNSS receiver 100. For example, when representing a received signal with two-bits or three-bits, the FEP 114 is required to perform a write operation into the signal storage memory 116 and the IGSP module 118 is required to perform a read operation from the signal storage memory 116, which increases power consumed by the GNSS receiver. It is noted, however, when the received signal is represented by one-bit, these write and reads operations are performed less often by the FEP 114 and IGSP module 118, respectively, and hence less power is used by the GNSS receiver 100.

Continuing with reference to FIG. 3, the sin/cos local carrier generation modules 126a-126c receive a signal (which is a complex signal) from the ADC 112 at a 48fx clock rate. Each of the sin/cos local carrier generation modules 126a-126c includes a look-up table (LUT), which is shown in FIG. 4 for example, that includes values for the sin/cos functions.

The complex signal received from the ADC 112 includes the $I_L$ and $Q_L$ data streams (FIG. 5) of the signal received by the GNSS receiver 100. The sin/cos carrier generation modules 126a-126c process the signal received from the ADC 112 and generate two three-bit signals using the values for the sin/cos function contained in the LUT of FIG. 4. The sin/cos carrier generation modules 126a-126c transmit the two three-bit signals representing the $I_L$ and $Q_L$ data streams to a corresponding complex mixer 128a-128c.

Figure 5:
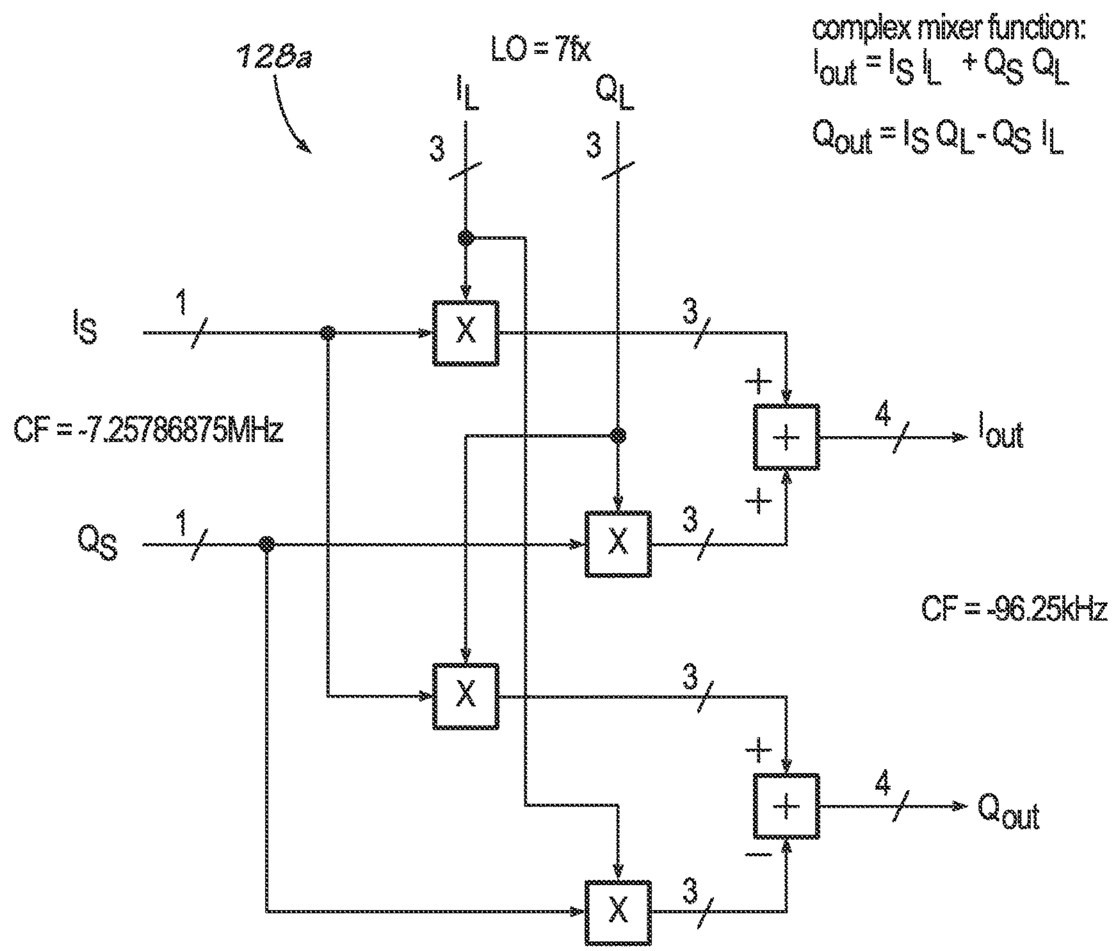
FIG. 5 is a diagram illustrating components of the complex mixer, according to an embodiment of the present invention.

FIG. 5 is a diagram illustrating components of the complex mixers 128a-128c of the FEP 114, according to an embodiment of the present invention. As the complex mixers 128a-128c are identical, for illustrative purposes, only the complex mixer 128a is shown. The complex mixer 128a includes a plurality of multipliers and adders that are arranged to receive the two three-bit signals representing the $I_L$ and $Q_L$ data streams and two one-bit signals representing the $I_S$ and $Q_S$ data streams from the ADC 112. It is noted that the two one-bit signals received from the ADC 112 are transmitted at the 48fx clock rate. The complex mixer 128a performs a mixing operation using the following complex mixer functions:

$$I_{out}=I_S I_L+Q_S Q_L \quad (1),$$

$$Q_{out}=I_S I_L-Q_S Q_L \quad (2).$$

As shown in FIG. 3, after the complex mixing function is performed, the complex mixer 128*a* outputs two complex four-bit signals that represent the $I_{out}$ and $Q_{out}$ data streams.

Figure 6:
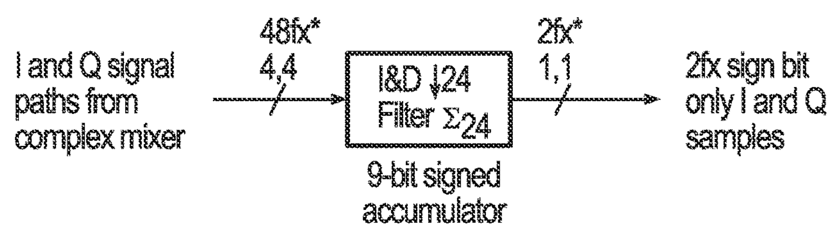
FIG. 6 is a diagram illustrating an operation of a filter of the FEP, according to an embodiment of the present invention.

FIG. 6 is a diagram illustrating an operation of the I&D filters 130*a*-130*c* of the FEP 114, according to an embodiment of the present invention. As the I&D filters 130*a*-130*c* are identical, for illustrative purposes, only the operation of the I&D filter 130*a* is shown. As illustrated in FIG. 6, the I&D filter 130*a* is a nine-bit signed accumulator that is configured to perform a known integrate and dump function for outputting two complex one-bit signals that represent the $I_{out}$ and $Q_{out}$ data streams, e.g., two sign bits. For illustrative purposes, the $I_{out}$ and $Q_{out}$ data streams outputs from the complex mixer 128*a* are represented as one signal. It is noted that the two one-bit signals are transmitted at a 2fx clock rate (e.g., for the GPS/Galileo GNSSs) to the signal storage memory 116, which outputs a sign bit value, i.e., either a plus one or minus one. In the instance where the signal being processed is received from the Glonass and Beidou GNSSs, corresponding I&D filters 130*b*, 130*c* are configured to transmit the two one-bit signals at a 4fx clock rate and 8fx clock rate, respectively (see FIG. 3 for example), to the signal storage memory 116.

It is noted that the 2fx is twice the rate of fx, which is the rate at which the GPS pseudo noise code (PN) reference code is transmitted, plus a slight frequency offset which is significant to the signal processing methods described herein. The 2fx rate is one of the sampling frequencies that are used to store information in the signal storage memory 116. For higher performance, the signal storage memory 116 can be stored with 4x, 8fx, or 12fx data.

The signal storage memory 116 is used to allow the IGSP module 118 (which runs at a much higher clock rate than 2fx) to process the data multiple times with multiple hypotheses. Each hypothesis can represent another satellite or another GNSS system, or another time alignment or carrier frequency.

Figure 7:
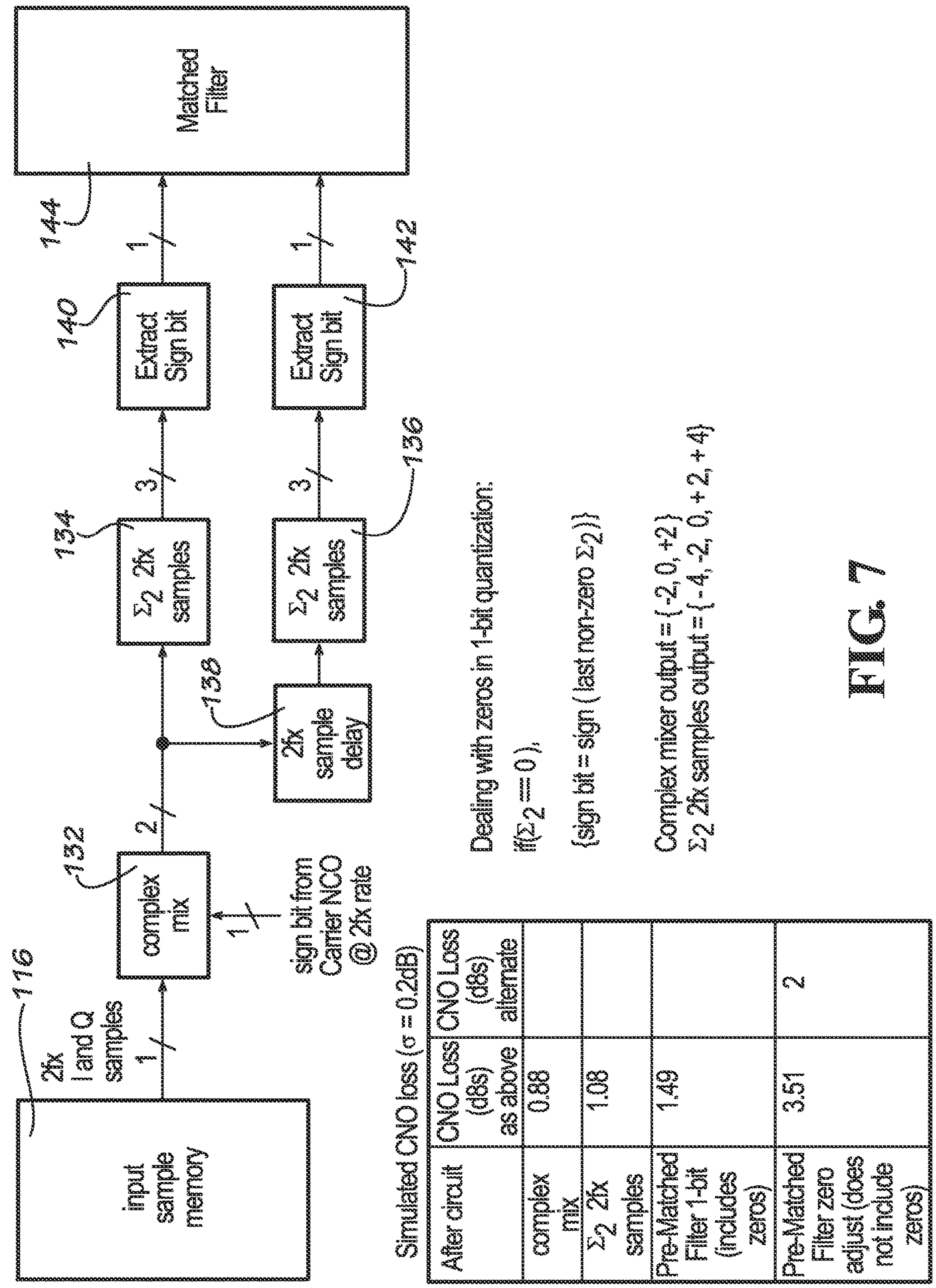
FIG. 7 is diagram illustrating low power circuitry of an IGSP module of the GNSS receiver, according to an embodiment of the present invention.

FIG. 7 is diagram illustrating low power circuitry of the IGSP module 118 of the GNSS receiver 100, according to an embodiment of the present invention. As shown in FIG. 7, the two one-bit signals of the $I_{out}$ and $Q_{out}$ data streams, which are complex signals, are transmitted from the signal storage memory 116 to a complex mixer 132 of the IGSP module 118. The complex mixer 132 also receives a sign bit from a carrier numerically controlled oscillator (NCO 148, see FIG. 8) at a 2fx clock rate and performs a known complex mix function of the two one-bit signals for the $I_{out}$ and $Q_{out}$ data streams and the sign bit from the NCO 148 and outputs a complex two-bit signal (e.g., minus two, zero, or plus two) that is transmitted to summation modules 134, 136.

In order to correlate the signals output from the summation modules 134, 136, the two-bit complex signal that is transmitted to the summation module 136 is delayed by a 2fx sample delay module 138. As can be appreciated, the 2fx sample delay module 138 can be used to delay the two-bit complex signal that is transmitted to the summation module 134 instead of the two-bit complex signal that is transmitted to the summation module 136.

The summation modules 134, 136 perform known summation functions and transmit a three-bit signal (e.g., minus four, minus two, zero, plus two, or plus four) to respective sign bit extraction modules 140, 142 that are programmed to extract a sign bit from the resultant signal.

The extracted signs bits are transmitted to a matched filter module 144 that is programmed to compare the sign bits received from the sign bit extraction modules 140, 142 to the PN reference code from the satellite that transmitted the received signal. More particularly, each satellite transmits a unique code by which it is identifiable. The PN reference code is transmitted at a one a rate. The sign bits received from the sign bit extraction modules 140, 142 represent two time offset position hypotheses of the alignment with the received signal. The correctness of these hypotheses is tested in the matched filter module 144 via correlating the Q and I data streams from the sign bits received from the sign bit extraction modules 140, 142 against a steam of PN bits. A match between the received sign bits and the PN reference code indicates to the IGSP module 118 that the received signal represented by the sign bits has not been compromised, i.e., is not corrupted. Thereafter, the represented signal is processed by the remaining components (e.g., signal hypothesis memory module 119, an acquire/track module 121 (FIG. 9, etc.)) of the IGSP module 118 and transmitted to the navigation solution module 120, which generates the navigation solution.

Figure 8:
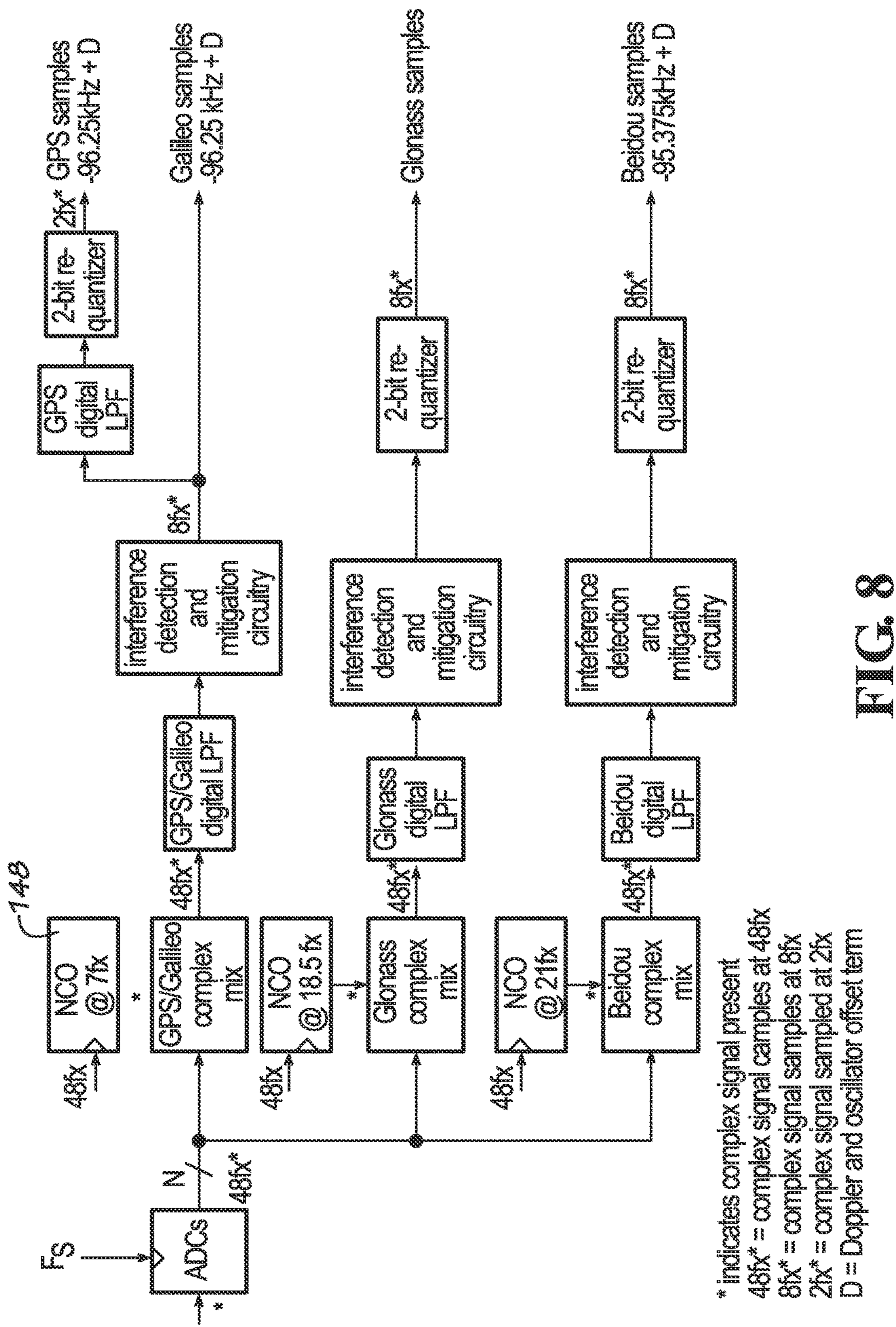
FIG. 8 is a diagram illustrating high power circuitry components of the FEP shown in FIG. 2, according to an embodiment of the present invention.
Figure 9:
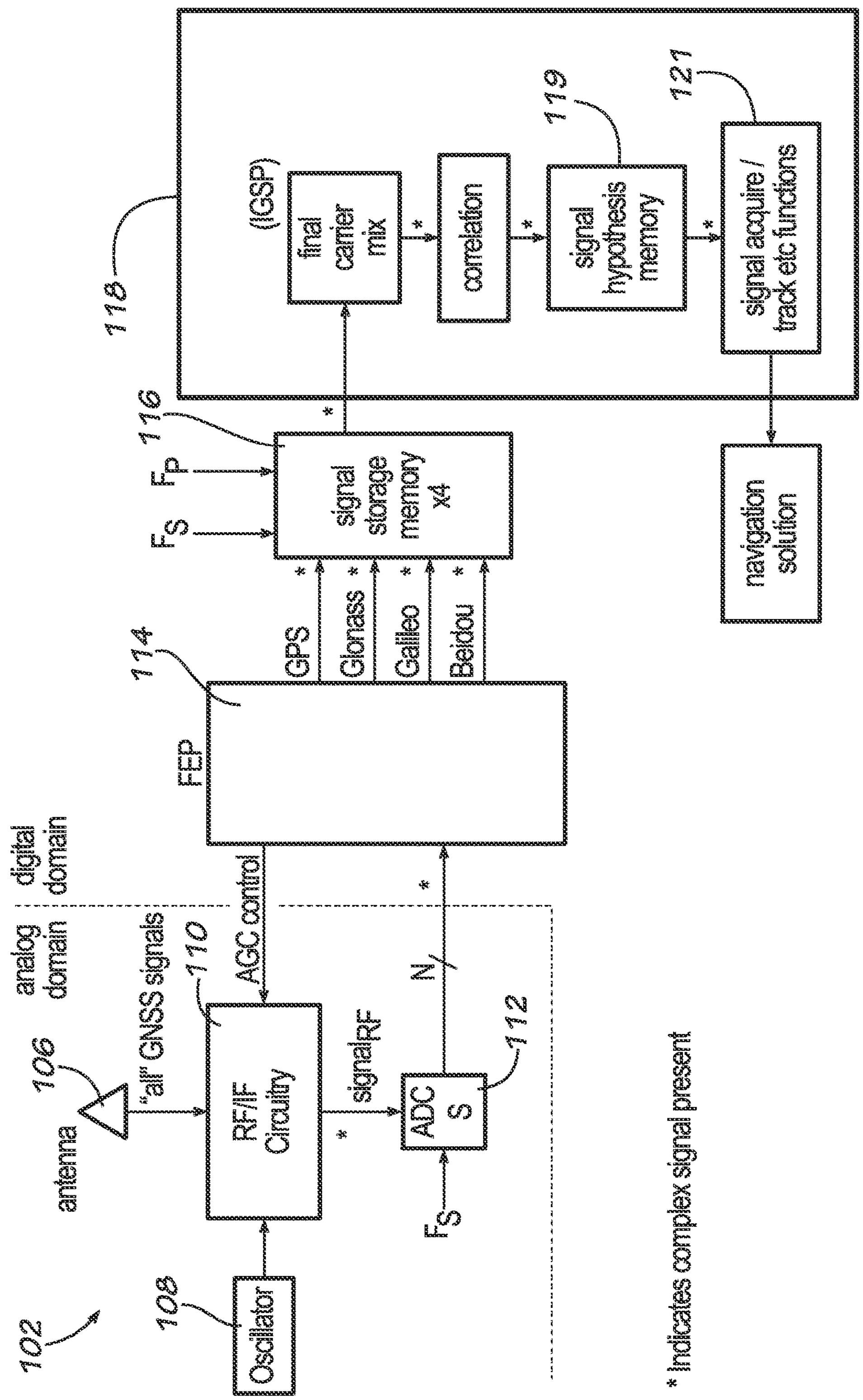
FIG. 9 is a diagram illustrating high power circuitry components of the IGSP module shown in FIG. 2, according to an embodiment of the present invention.

FIG. 8 is a diagram illustrating high power circuitry components of the FEP 114, and FIG. 9 is a diagram illustrating high circuitry components of the IGSP module 118, according to an embodiment of the present invention. The high power circuitry components of the FEP 114 and IGSP module 118 are used when the FEP 114 is operating in the first mode of operation, i.e., when a detected $C/N_o$ is below or equal to a predetermined threshold. The high power circuitry components illustrated in FIGS. 8 and 9 are known and as such a detailed description is omitted for conciseness.

It is noted, however, that when the FEP 114 and/or the IGSP module 118 are operating in the first mode of operation there is significant power consumption at the GNSS receiver 110 due to the additional circuitry illustrated in FIGS. 8 and 9 that is needed to process the received signal.

More particularly, the high power circuitry processes a digitized signal, received from the ADC 112, which can be two-bits to ten-bits (or sometimes more). The additional bits are used to provide lower $C/N_o$ loss in the presence of Gaussian noise and greater interference mitigation capability in the presence of interference sources (e.g. narrow band continuous wave (CW) jammers). Additionally, the high power circuitry uses the higher digital bit representations in order to accommodate for the dynamic range requirements that are, typically, required by the GNSS receiver 100.

Moreover, using a larger number of bits to represent a signal received at the GNSS receiver 100 also helps to reduce a harmonic content of the received signal; harmonic content in the received signal has been known to cause narrowband interferers, which may generate multiple CW jammers.

Bit representation of the signal received at the GNSS receiver 100 are typically greater than five-bits for I and Q data streams, and the first complex mix operations of the FEP 114, described above, can involve greater than ten-bit outputs, which require further processing by circuitry associated with the high power signaling processing path of the FEP 114 and/or the IGSP module 118. As shown in FIG. 8, for each GNSS the FEP 114 may include one or more low pass filters, interference detection and mitigation circuitry, requantization modules, etc., and as shown in FIG. 9, the IGSP module 118 may include the signal hypothesis memory module 119, the signal acquire/track module 121, etc.

Figure 10:
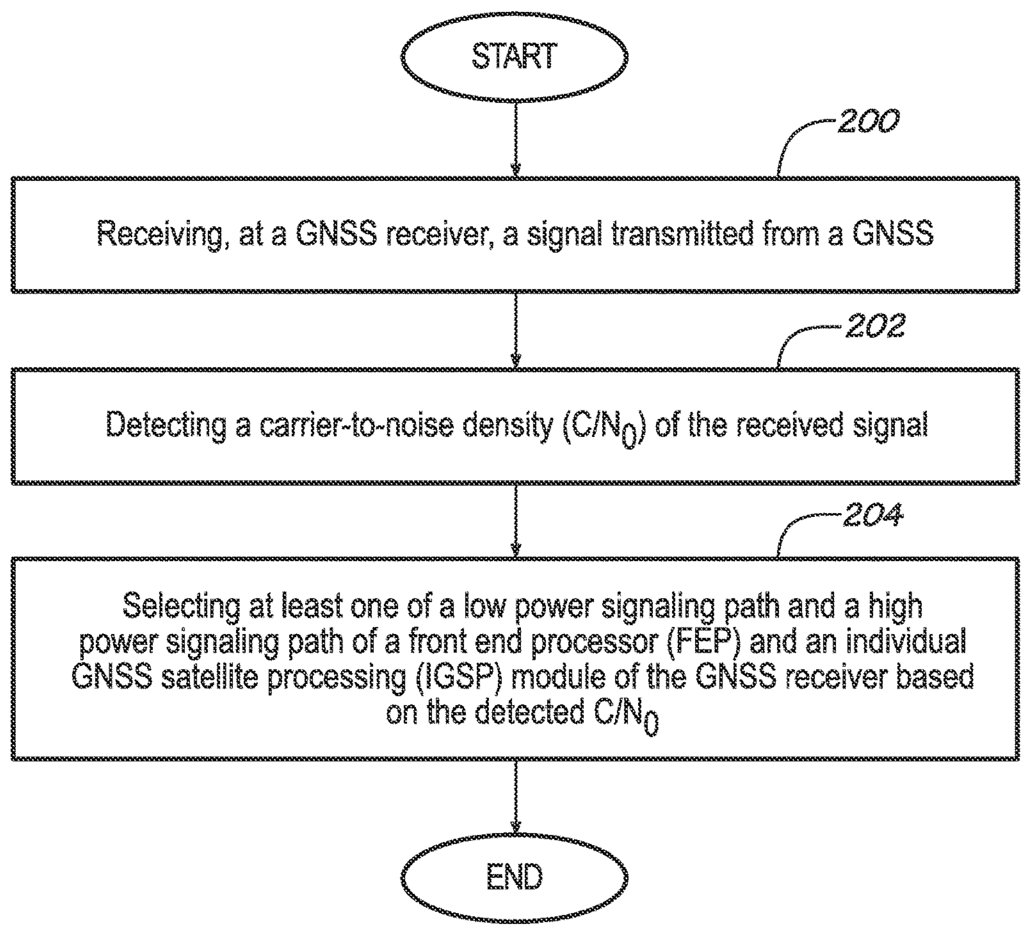
FIG. 10 illustrates a method for processing a signal received from a GNSS.

Operation of a method for processing a signal received from a GNSS is now described with reference to FIG. 10.

For illustrative purposes, the method is described in terms of receiving a signal transmitted from the GPS GNSS.

In use, a signal is received by the GNSS receiver 100 from at least one of the GNSSs, e.g., the GPS, at step 200. The module 124*a* detects a $C/N_o$ of the received signal, at step 202. If the detected $C/N_o$ is equal to or greater than a predetermined $C/N_o$ threshold, the module 124*a* places the GNSS receiver 100 in the second mode of operation, at step 204. Conversely, if the detected $C/N_o$ is equal to or less than the aforementioned $C/N_o$ threshold, the module 124*a* places the GNSS receiver 100 in the first mode of operation, also at step 204. As noted above, when a particular mode of operation is selected, i.e., either the low power signal processing path or the high power signal processing path), the other signal processing path is turned OFF.

In the instance where the second mode of operation is selected, the low power signal processing path processes less bits than the ADC 112 output. For example, for lowest power operation, instead of using all five-bits of a digitized signal from the ADC 112, one-bit (e.g., the sign bit) is used as a representation of the digitized signal.

Once the second mode of operation is selected, the one-bit representation of the digitized signal is processed through the components of low power signal processing paths of the FEP 114 and IGSP module 118, as described above.

If a $C/N_o$ of a received signal falls below the predetermined $C/N_o$ threshold, the module 124*a* switches to the first mode of operation and all of the bits, e.g., the five-bits, of the digitized signal from the ADC 112 are used and processed through the high power signal processing path of the FEP 114.

It may, however, prove advantageous to maintain the IGSP module 118 in the second mode of operation after the FEP 114 is switched to the first mode of operation. Thus, in accordance with embodiments of the present invention, the FEP 114 and IGSP module 118 may be independently controlled in relation to each other. That is, the FEP 114 can be switched to the first mode of operation while the IGSP module 118 is maintained in the second mode of operation (e.g., to maintain signal track and measurement integrity) and vice versa.

Providing the GNSS receiver 100 with the capability to switch to between the first and second modes of operation, e.g., in the case when $C/N_o$ loss and interference mitigation capability is not a priority, reduces overall power consumption of the GNSS receiver 100 and, therefore, overcomes the shortcomings of convention GNSS receivers.

Moreover, providing the GNSS receiver 100 with the capability to switch to between the first and second modes of operation may prove beneficial in areas such as urban canyon (UC) environments (e.g., large $C/N_o$ variation between satellites seen in such environments) where individual satellites can be targeted for low power operation.

From the foregoing and with reference to the various figure drawings, those skilled in the art will appreciate that certain modifications can also be made to the present invention without departing from the scope of the same. For example, instead of (or in addition to) the low power mode of operation which uses the low power signal processing path, the GNSS receiver 100 may use one or more high power modes of operation (e.g., a third mode of operation), such as, for example, when higher performance (e.g., being able to detect weaker signals) is needed. In this instance, the high power mode of operation uses a high power signaling path that is different from the high power signaling path described hereinabove regarding the FEP 114 and IGSP module 116.

Figure 11:
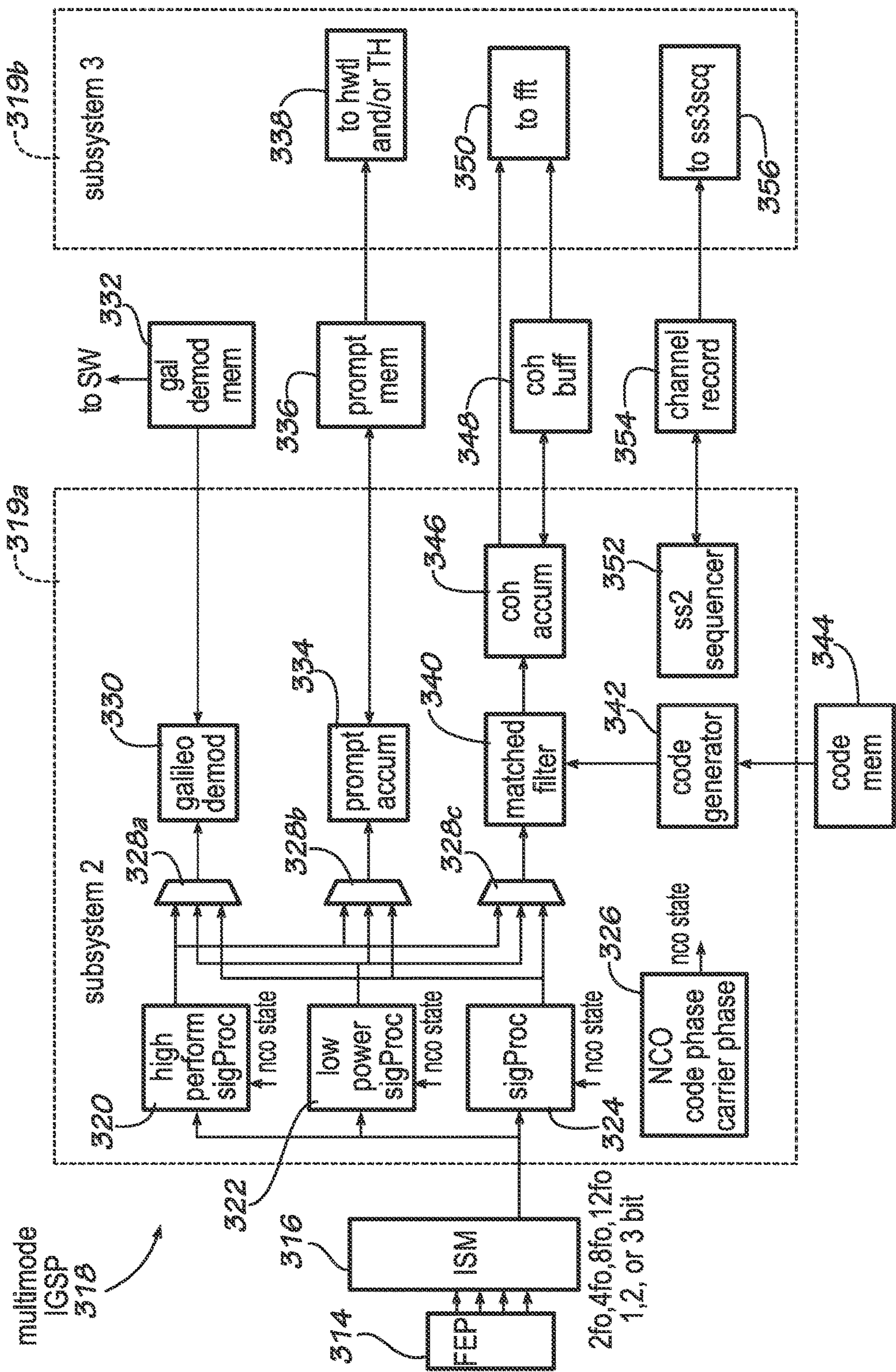
FIG. 11 is a diagram illustrating components of a GNSS receiver, according to an embodiment of the present invention.

Referring to FIG. 11, the GNSS receiver 100 may include an FEP 314 and a signal storage memory 316 that is configured to communicate with a multi-mode IGSP module 318, according to an embodiment of the present invention.

The signal storage memory 316 includes components similar to that of the signal storage memory 116 and functions similarly to the signal storage memory 116. Likewise, the FEP 314 includes components similar to that of the FEP 114 and functions similarly to the FEP 114. Accordingly, a detailed description of these components is omitted for the sake of brevity.

As can be appreciated, certain modifications may need to be made to the signal storage memory 316 and the FEP 314 in order for these components to operate in the third mode of operation.

The multi-mode IGSP module 318 includes a subsystem 319*a* and a subsystem 319*b*.

The subsystem 319*a* includes a high performance signal processing module 320, a low performance signal processing module 322, and a regular performance signal processing module 324 each of which receives an input signal from an NCO 326 and the signal storage memory 316.

Each of the high performance signal processing module 320, the low performance signal processing module 322, and the regular performance signal processing module 324 outputs a signal to three modules 328*a*-328*c*, e.g., multiplexers. The signal can be, for example, one or more bits, depending on the mode of operation.

The module 328*a* outputs a signal to a Galileo demodulator 330, which is in bi-directional communication with a Galileo demodulation memory module 332. The Galileo demodulation memory module 332 outputs a signal to one or more other components of the GNSS receiver 100, such as a software/hardware (SW/HW) interface.

The module 328*b* outputs a signal to a prompt accumulator 334, which is in bi-directional communication with a prompt memory module 336, which outputs a signal to one or more component of the subsystem 319*b* of multi-mode IGSP module 318. For example, the prompt memory module 336 may output a signal to a hardware tracking loop module 338, or other module, such as a TH module.

The module 328*c* outputs a signal to a matched filter module 340, which receives an input signal from a code generator module 342 (or loader not shown), which receives an input signal from a code memory module 344.

The matched filter module 340 outputs a signal to a coherent accumulator module 346, which is in bidirectional communication with a coherent buffer module 348, and outputs a signal to one or more components of the subsystem 319*b* of the multi-mode IGSP module 318, e.g., a fast furrier transform (FFT) module 350. The coherent buffer module 348 also outputs a signal to the FFT module 350.

A sequencer 352 of the subsystem 319*a* is in bidirectional communication with a channel record module 354, which outputs a signal to one or more components of the subsystem 319*b* of the multi-mode IGSP module 318, e.g., a sequencer 356.

Use of the GNSS receiver 100 that includes the multi-mode IGSP 316 is similar to that of the GNSS 100 that includes the IGSP 116 described above. Unlike the IGSP 116, the multi-mode IGSP 316 is configured to operate in three modes of operation. That is, in addition to the two modes of operation described above, the multi-mode IGSP 316 is also configured to operate in the third mode of operation when higher performance (e.g., being able to detect weaker signals) is needed.

As can be appreciated, the FEP 314 and the signal storage memory 316 are also configured to operate in the third mode of operation.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A global navigation satellite system (GNSS) receiver comprising:

a front end processor (FEP) including an FEP low power signaling path and an FEP high power signaling path;

an individual GNSS satellite processing (IGSP) module including an IGSP low power signaling path and an IGSP high power signaling path; and a module programmed to detect a carrier-to-noise density ($C/N_o$) of a signal received at the GNSS receiver and select at least one of the FEP low power signaling path and the FEP high power signaling path of the FEP and the IGSP low power signaling path and the IGSP high power signaling path of the IGSP module based on the detected $C/N_o$, wherein when the FEP and the IGSP module process the received signal using the selected at least one of the FEP low power signaling path and the IGSP low power signaling path, a first amount of bits of the received signal are processed, and when the FEP and the IGSP module process the received signal using the selected at least one of the FEP high power signaling path and the IGSP high power signaling path, a second amount of bits, which is greater than the first amount of bits, of the received signal are processed.

2. The GNSS receiver according to claim 1, wherein, if the detected $C/N_o$ is above or equal to a predetermined threshold, the module selects the low power signaling path for at least one of the FEP and IGSP.

3. The GNSS receiver according to claim 2, wherein the predetermined threshold of $C/N_o$ of the received signal ranges from 21dB-Hz to 54dB-Hz.

4. The GNSS receiver according to claim 1, wherein, if the detected $C/N_o$ is below or equal to a predetermined threshold, the module selects the high power signaling path for at least one of the FEP and IGSP.

5. The GNSS receiver according to claim 4, wherein the predetermined threshold of $C/N_o$ of the received signal ranges from 5dB-Hz to 20dB-Hz.

6. The GNSS receiver according to claim 1, wherein processing a received signal through the low power signaling path of the FEP automatically turns off the high power signaling path of the FEP and vice versa.

7. The GNSS receiver according to claim 1, wherein processing a received signal through the low power signaling path of the IGSP automatically turns off the high power signaling path of the IGSP and vice versa.

8. A method for processing a signal received from a global navigation satellite system (GNSS), the method comprising:

receiving, at a GNSS receiver, a signal transmitted from a GNSS;

detecting a carrier-to-noise density ($C/N_o$) of the received signal;

selecting at least one of a front end processor (FEP) low power signaling path and an FEP high power signaling path of an FEP and an individual GNSS satellite processing (IGSP) low power signaling path and an IGSP high power signaling path of an IGSP module of the GNSS receiver based on the detected $C/N_o$; and when the FEP and the IGSP module process the received signal using the FEP low power signaling path and the IGSP low power signaling path, respectively, processing a first amount of bits of the received signal, and when the FEP and the IGSP module process the received signal using the FEP high power signaling path and the IGSP high power signaling path, respectively, processing a second amount of bits, which is greater than the first amount of bits, of the received signal.

9. The method according to claim 8, wherein, if the detected $C/N_o$ is above or equal to a predetermined threshold, selecting comprises selecting the low power signaling path for at least one of the FEP and IGSP.

10. The method according to claim 9, wherein the predetermined threshold of $C/N_o$ of the received signal ranges from 21dB-Hz to 54dB-Hz.

11. The method according to claim 8, wherein, if the detected $C/N_o$ is below or equal to a predetermined threshold, selecting comprises selecting the high power signaling path for at least one of the FEP and IGSP.

12. The method according to claim 11, wherein the predetermined threshold of $C/N_o$ of the received signal ranges from 5dB-Hz to 20dB-Hz.

13. The method according to claim 8, further comprising, if a received signal is processed through the low power signaling path of the FEP, automatically turning off the high power signaling path of the FEP.

14. The method according to claim 8, further comprising, if a received signal is processed through the low power signaling path of the IGSP, automatically turning off the high power signaling path of the IGSP.

15. A global navigation satellite system (GNSS) receiver comprising:

a front end processor (FEP) including a low power signaling path and a high power signaling path; and a module programmed to detect a carrier-to-noise density ($C/N_o$) of a signal received at the GNSS receiver and select at least one of the low power signaling path and the high power signaling path of the FEP based on the detected $C/N_o$, wherein when the FEP processes the received signal using the low power signaling path, a first amount of bits of the received signal are processed, and when the FEP processes the received signal using the high power signaling path a second amount of bits, which is greater than the first amount of bits, of the received signal are processed.

16. A global navigation satellite system (GNSS) receiver comprising:

an individual GNSS satellite processing (IGSP) module including a low power signaling path and a high power signaling path; and a module programmed to detect a carrier-to-noise density ($C/N_o$) of a signal received at the GNSS receiver and select at least one of the low power signaling path and the high power signaling path of the IGSP module based on the detected $C/N_o$, wherein when the IGSP module processes the received signal using the low power signaling path, a first amount of bits of the received signal are processed, and when the IGSP module processes the received signal using the high power signaling path a second amount of bits, which is greater than the first amount of bits, of the received signal are processed.

* * * * *